United States Patent
Stojanovski

(10) Patent No.: US 12,322,835 B2
(45) Date of Patent: Jun. 3, 2025

(54) FINGERPROOF TERMINAL ARRANGEMENT FOR HIGH-VOLTAGE APPLICATIONS

(71) Applicant: GM GLOBAL TECHNOLOGY OPERATIONS LLC, Detroit, MI (US)

(72) Inventor: Mitchell Stojanovski, Birmingham, MI (US)

(73) Assignee: GM Global Technology Operations LLC, Detroit, MI (US)

(*) Notice: Subject to any disclaimer, the term of this patent is extended or adjusted under 35 U.S.C. 154(b) by 616 days.

(21) Appl. No.: 17/836,938

(22) Filed: Jun. 9, 2022

(65) Prior Publication Data

US 2023/0402726 A1 Dec. 14, 2023

(51) Int. Cl.
*H01M 50/545* (2021.01)
*H01M 50/552* (2021.01)

(52) U.S. Cl.
CPC ....... *H01M 50/545* (2021.01); *H01M 50/552* (2021.01)

(58) Field of Classification Search
CPC .......................... H01M 50/545; H01M 50/552
See application file for complete search history.

(56) References Cited

U.S. PATENT DOCUMENTS 10,971,714 B2 4/2021 Tallman et al.

OTHER PUBLICATIONS

Laleh, Mendla, Tallman; Electircal Connection Unit for High-Voltage Nattery Packs; U.S. Appl. No. 17/557,516, filed Dec. 21, 2021.

*Primary Examiner* — Jane J Rhee
(74) *Attorney, Agent, or Firm* — Quinn IP Law

(57) ABSTRACT

A terminal arrangement for high-voltage batteries is disclosed. The terminal arrangement includes a substrate having concentric generally tubular inner and outer walls extending from an upper surface of the substrate, with an annular terminal disposed on the upper surface between the inner and outer walls. The inner and outer walls have respective inner and outer heights above a top surface of the annular terminal and the annular terminal has a radial span between the inner and outer walls, wherein the inner and outer heights and the radial span are sized so as to preclude human fingertips above a predetermined size from touching the annular terminal.

20 Claims, 7 Drawing Sheets

FINGERPROOF TERMINAL ARRANGEMENT FOR HIGH-VOLTAGE APPLICATIONS

INTRODUCTION

Batteries are often connected together to form battery packs. A concern that may arise with individual batteries having high voltage, or with a battery pack having high voltage, is the safety of human operators involved in the handling of such batteries. For example, one concern is that a human operator may inadvertently touch one or more exposed battery terminals and receive an electrical shock. Another concern is that a wrench or other metallic tool might be inadvertently dropped or positioned by a human operator or an assembly robot against one or more exposed battery terminals and cause an electric arc or discharge.

These concerns are often addressed by covering the terminals with plastic caps (e.g., during shipment and storage of the batteries) in order to prevent human operators from inadvertently touching the terminals or causing a tool to make contact with the terminals. However, providing such terminal covers increases cost, parts count and recycling/landfill waste concerns, and must also be removed prior to fastening a connector to the terminal.

SUMMARY

According to one embodiment, a terminal arrangement includes a substrate made of a first electrically insulative material and having an upper surface. A generally tubular inner wall extends at a first end thereof from the upper surface and terminates at a second end thereof opposite the first end, wherein the inner wall is made of a second electrically insulative material and has an inner circumferential surface disposed at an inner radius from a central axis of the inner wall and an annular lip extending inward from the second end. A generally tubular outer wall extends at a third end thereof from the upper surface and terminates at a fourth end thereof opposite the third end, wherein the outer wall is made of a third electrically insulative material and has an outer radius larger than the inner radius extending from the central axis, wherein the outer wall is concentric with the inner wall. An electrically conductive annular terminal is disposed atop the upper surface and encircles the inner wall between the inner and outer walls. And, an electrically conductive tubular terminal extends through an aperture formed in the upper surface of the substrate and has an outer circumferential surface disposed in contact with the inner circumferential surface of the inner wall.

In this embodiment, the outer wall is attached to the substrate by the substrate having a first plurality of slots formed in the upper surface and the outer wall having a second plurality of tabs extending radially outward from the third end, with the second plurality of tabs being snap-fitted into respective ones of the first plurality of slots, or by the outer wall being molded as part of the substrate. Additionally, the inner wall is attached to the substrate by at least one of: (i) the substrate having a third plurality of slots formed in the upper surface and the inner wall having a fourth plurality of tabs extending radially outward from the first end, with the fourth plurality of tabs being snap-fitted into respective ones of the third plurality of slots; (ii) the inner wall being press-fitted onto an upper portion of the tubular terminal and the tubular terminal having one or more shoulders on the outer circumferential surface which are wider than the aperture so as to prevent a lower portion of the tubular terminal from passing through the aperture; and (iii) the inner wall being molded as part of the substrate.

The first plurality of slots, the second plurality of tabs, the third plurality of slots and the fourth plurality of tabs may each be arranged circumferentially about the central axis. The inner wall may be molded as part of the substrate and may cover at least a portion of the tubular terminal. Also, the outer wall may be molded as part of the substrate and the outer wall may comprise a plurality of outer wall segments arranged circumferentially about the central axis. The inner and outer walls may have respective inner and outer heights above a top surface of the annular terminal and the annular terminal may have a radial span between the inner and outer walls, wherein the inner and outer heights and the radial span are sized so as to preclude human fingertips above a predetermined size from touching the annular terminal. Additionally or alternatively, the annular lip may have an annular lip thickness and may define an annular hole having an annular hole diameter, wherein the annular hole diameter and the annular lip thickness are sized so as to preclude human fingertips above a predetermined size from touching the tubular terminal.

The second and third electrically insulative materials may be the same, or the first, second and third electrically insulative materials may be the same. The terminal arrangement may further include a dielectric layer covering the substrate and having a window formed therein through which respective portions of the inner wall, the outer wall and the tubular terminal protrude. The terminal arrangement may also include an electrical line carried by the substrate and operatively connected to at least one of the annular terminal and the tubular terminal.

According to another embodiment, a terminal arrangement for a high-voltage battery includes: (i) a substrate made of a first electrically insulative material and having an upper surface; (ii) a generally tubular inner wall extending at a first end thereof from the upper surface and terminating at a second end thereof opposite the first end, wherein the inner wall is made of a second electrically insulative material and has an inner circumferential surface disposed at an inner radius from a central axis of the inner wall and an annular lip extending inward from the second end; (iii) a generally tubular outer wall extending at a third end thereof from the upper surface and terminating at a fourth end thereof opposite the third end, wherein the outer wall is made of a third electrically insulative material and has an outer radius larger than the inner radius extending from the central axis, wherein the outer wall is concentric with the inner wall; (iv) an electrically conductive annular terminal disposed atop the upper surface and encircling the inner wall between the inner and outer walls; (v) an electrically conductive tubular terminal extending through an aperture formed in the upper surface of the substrate and having an outer circumferential surface disposed in contact with the inner circumferential surface of the inner wall; (vi) a dielectric layer covering the substrate and having a window formed therein through which respective portions of the inner wall, the outer wall and the tubular terminal protrude; and (vii) an electrical line carried by the substrate and operatively connected to at least one of the annular terminal and the tubular terminal.

In this embodiment, the outer wall is attached to the substrate by (a) the substrate having a first plurality of slots formed in the upper surface and the outer wall having a second plurality of tabs extending radially outward from the third end, with the second plurality of tabs being snap-fitted into respective ones of the first plurality of slots, or (b) the outer wall being molded as part of the substrate. Also in this embodiment, the inner wall is attached to the substrate by at least one of (c) the substrate having a third plurality of slots formed in the upper surface and the inner wall having a fourth plurality of tabs extending radially outward from the first end, with the fourth plurality of tabs being snap-fitted into respective ones of the third plurality of slots, (d) the inner wall being press-fitted onto an upper portion of the tubular terminal and the tubular terminal having one or more shoulders on the outer circumferential surface which are wider than the aperture so as to prevent a lower portion of the tubular terminal from passing through the aperture, and (e) the inner wall being molded as part of the substrate.

Also in this embodiment, the first plurality of slots, the second plurality of tabs, the third plurality of slots and the fourth plurality of tabs may each be arranged circumferentially about the central axis. Also, the inner wall may be molded as part of the substrate and may cover at least a portion of the tubular terminal, and the outer wall may be molded as part of the substrate and the outer wall may comprise a plurality of outer wall segments arranged circumferentially about the central axis.

The inner and outer walls may have respective inner and outer heights above a top surface of the annular terminal and the annular terminal may have a radial span between the inner and outer walls, wherein the inner and outer heights and the radial span are sized so as to preclude human fingertips above a predetermined size from touching the annular terminal. Additionally, the annular lip may have an annular lip thickness and may define an annular hole having an annular hole diameter, wherein the annular hole diameter and the annular lip thickness are sized so as to preclude human fingertips above a predetermined size from touching the tubular terminal. Further, the second and third electrically insulative materials may be the same.

According to yet another embodiment, a terminal arrangement for a high-voltage battery includes: a substrate made of a first electrically insulative material and having an upper surface; a tubular inner wall extending at a first end thereof from the upper surface and terminating at a second end thereof opposite the first end, wherein the inner wall is made of a second electrically insulative material and has an inner circumferential surface disposed at an inner radius from a central axis of the inner wall and an annular lip extending inward from the second end; a tubular outer wall extending at a third end thereof from the upper surface and terminating at a fourth end thereof opposite the third end, wherein the outer wall is made of a third electrically insulative material and has an outer radius larger than the inner radius extending from the central axis, wherein the outer wall is concentric with the inner wall; an electrically conductive annular terminal disposed atop the upper surface and encircling the inner wall between the inner and outer walls; and an electrically conductive tubular terminal extending through an aperture formed in the upper surface of the substrate and having an outer circumferential surface disposed in contact with the inner circumferential surface of the inner wall.

The outer wall is attached to the substrate by the substrate having a first plurality of slots formed in the upper surface and the outer wall having a second plurality of tabs extending radially outward from the third end, with the second plurality of tabs being snap-fitted into respective ones of the first plurality of slots. The inner wall is attached to the substrate by the inner wall being press-fitted onto an upper portion of the tubular terminal and the tubular terminal having one or more shoulders on the outer circumferential surface which are wider than the aperture so as to prevent a lower portion of the tubular terminal from passing through the aperture.

In this configuration, the inner and outer walls may have respective inner and outer heights above a top surface of the annular terminal and the annular terminal may have a radial span between the inner and outer walls, wherein the inner and outer heights and the radial span are sized so as to preclude human fingertips above a predetermined size from touching the annular terminal. The terminal arrangement may further include a dielectric layer covering the substrate and having a window formed therein through which respective portions of the inner wall, the outer wall and the tubular terminal protrude. This configuration may further include an electrical line carried by the substrate and operatively connected to at least one of the annular terminal and the tubular terminal.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
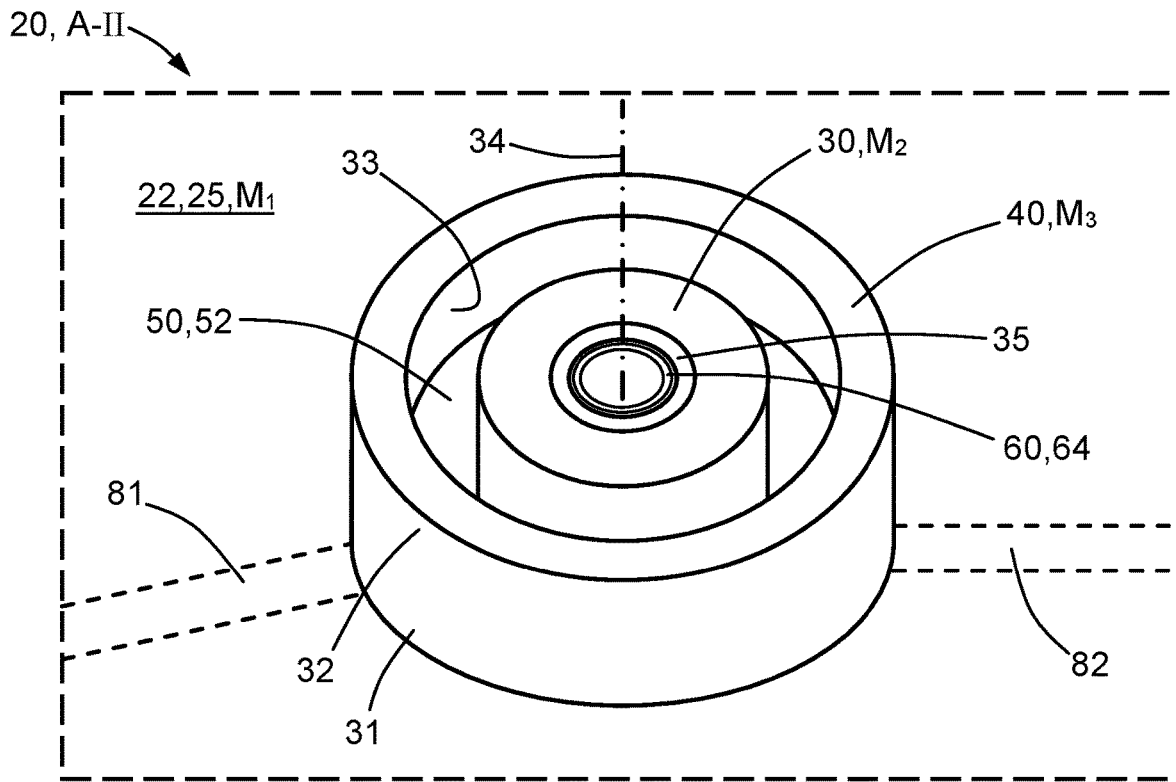
FIG. 1 is a schematic perspective view of a fingerproof terminal arrangement according to the present disclosure.

Referring now to the drawings, wherein like numerals indicate like parts in the several views, various embodiments of a fingerproof terminal arrangement 20 according to the present disclosure are shown and described herein. The various embodiments of the terminal arrangement 20 may be used in high-voltage applications, such as for the positive and negative terminals of batteries for electric and hybrid electric automotive vehicles, and may be designed and configured so as to render the terminal arrangement 20 fingerproof, as described in more detail below.

Figure 2:
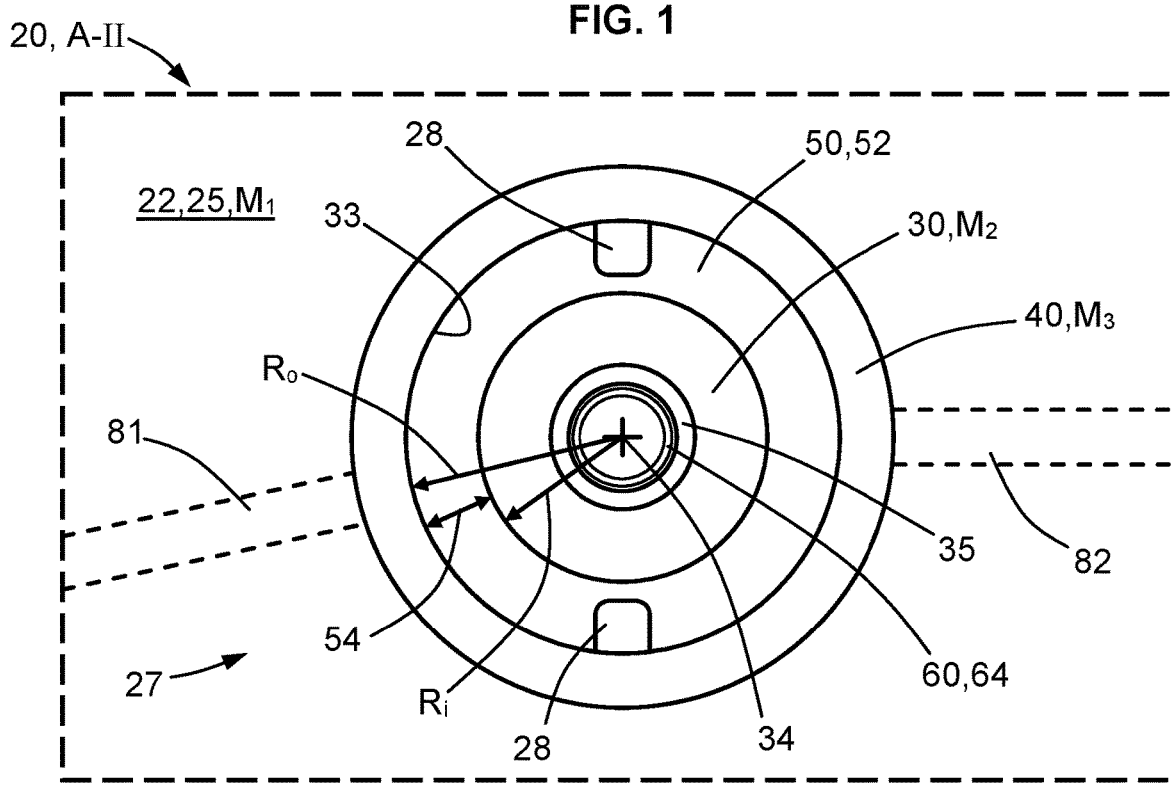
FIG. 2 is a schematic plan view of the terminal arrangement.

FIGS. 1-2 show schematic perspective and plan views, respectively, of one embodiment of the fingerproof terminal arrangement 20, while FIGS. 3-6 illustrate successive steps for assembling this embodiment. The terminal arrangement 20 includes a substrate 22 made of a first electrically insulative material $M_1$ and having an upper surface 25. Note that the long-dashed rectangle framing each of FIGS. 1-2 represents a portion of the overall substrate 22, while the short-dashed lines in FIGS. 1-2 represent first and second electrical lines 81, 82 running underneath the upper surface 25 of the substrate 22. The terminal arrangement 20 also includes a generally tubular inner wall or ring 30 and a generally tubular outer wall or ring 40, with the inner and outer walls 30, 40 being attached to the substrate 22 by one of multiple attachment configurations 99, as discussed below. Depending on the attachment configuration 99 used, the substrate 22 may include a first plurality 27 of slots 28 formed therein for attaching the outer wall to the substrate 22, and/or a third plurality 23 of slots 24 formed therein for attaching the inner wall 30 to the substrate 22. Note that while FIG. 2 shows only two slots 28, any number of slots 28 (and any number of slots 24) may be provided.

Figure 5:
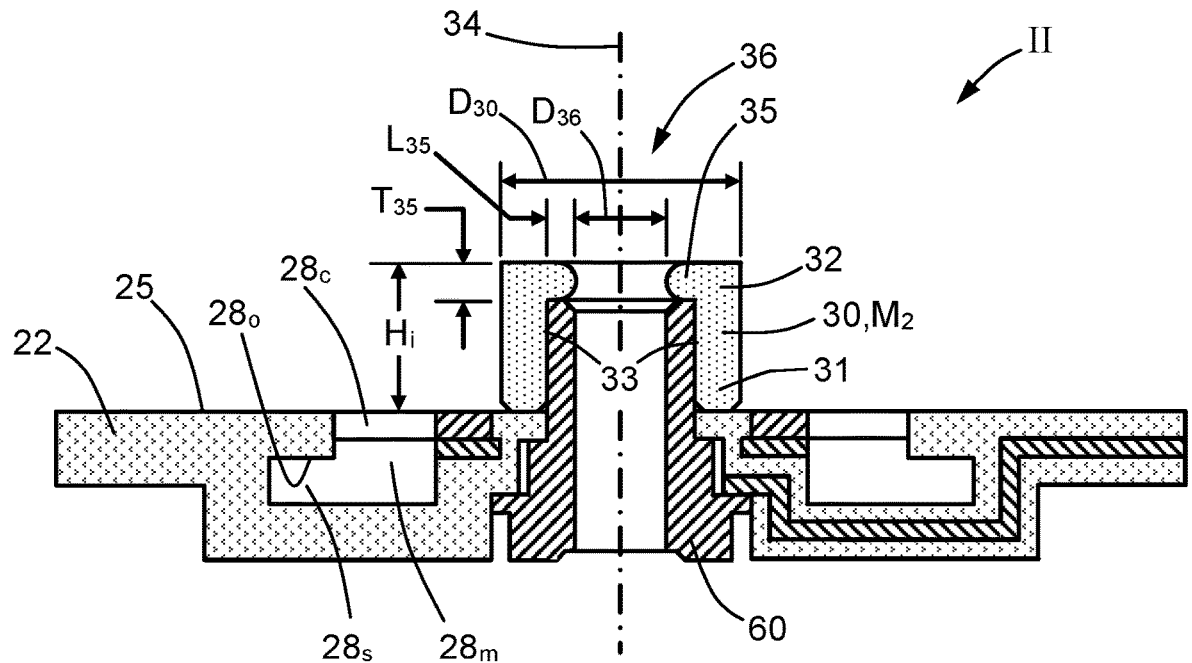
FIG. 5 is a schematic cross-sectional elevation view of the assembly of FIG. 4 with an inner wall added.

A generally tubular inner wall or ring 30 extends upward from the upper surface 25 of the substrate 22 from a first or lower end 31 of the inner wall 30, with the inner wall 30 terminating at a second or upper end 32 thereof which is opposite the first end 31. The inner wall is made of a second electrically insulative material $M_2$, has an inner wall height $H_i$ as measured from the upper surface 25, and has an inner circumferential surface 33 disposed at an inner radius $R_i$ from a central axis 34 of the inner wall 30 and an inner wall outer diameter $D_{30}$. The inner wall also has an annular lip 35 which extends inward from the second or upper end 32 and has an annular lip thickness or height $T_{35}$ (as measured along the central axis 34) and an annular lip length $L_{35}$ (as measured radially from the inner circumferential surface 33). The annular lip 35 defines an annular hole 36 having an annular hole diameter $D_{36}$, as shown in FIG. 5.

Figure 3:
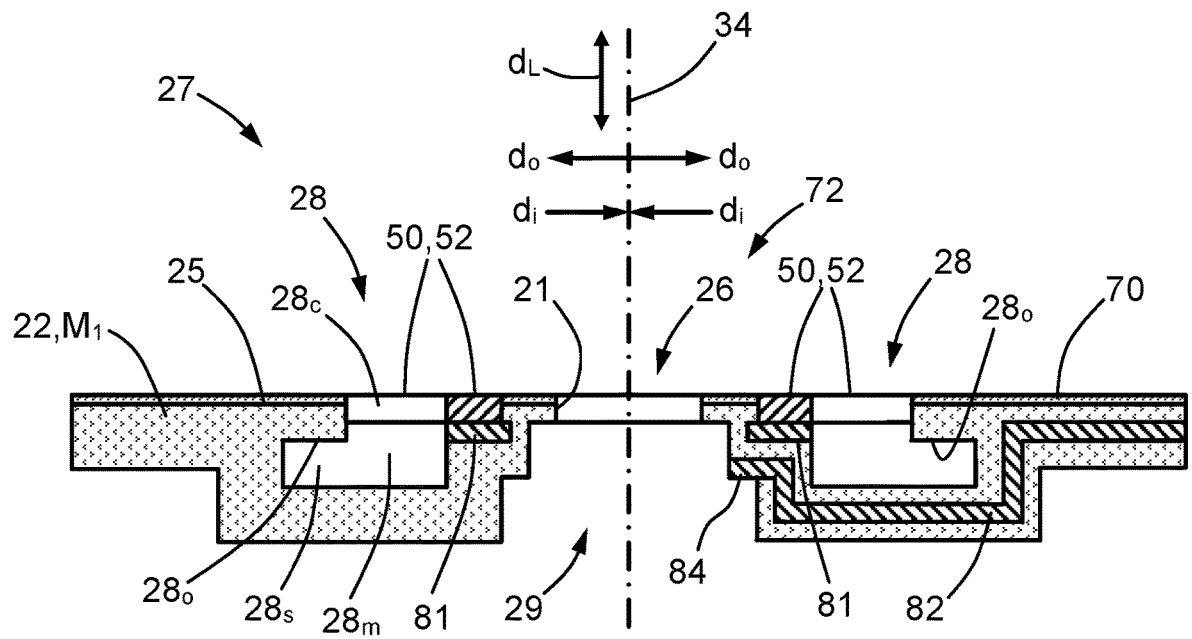
FIG. 3 is a schematic cross-sectional elevation view of a substrate and annular terminal according to one embodiment of the terminal arrangement.

As illustrated in the drawings and as described in further detail below, note that the inner wall 30—as well as the outer wall 40, the annular terminal 50 and the tubular terminal 60—may have generally circular or annular profiles that are mutually concentric with each other as viewed in plan view from above, with the central axis 34 running through the center of these profiles and defining an axis of revolution for the three-dimensional volumetric shapes of these elements 30, 40, 50, 60. Additionally, as shown in FIG. 3, the central axis 34 may define a radially inward direction di pointing toward the central axis 34, a radially outward direction do pointing away from the central axis 34, and a longitudinal direction $d_L$ pointing along or parallel to the central axis 34.

Figure 13:
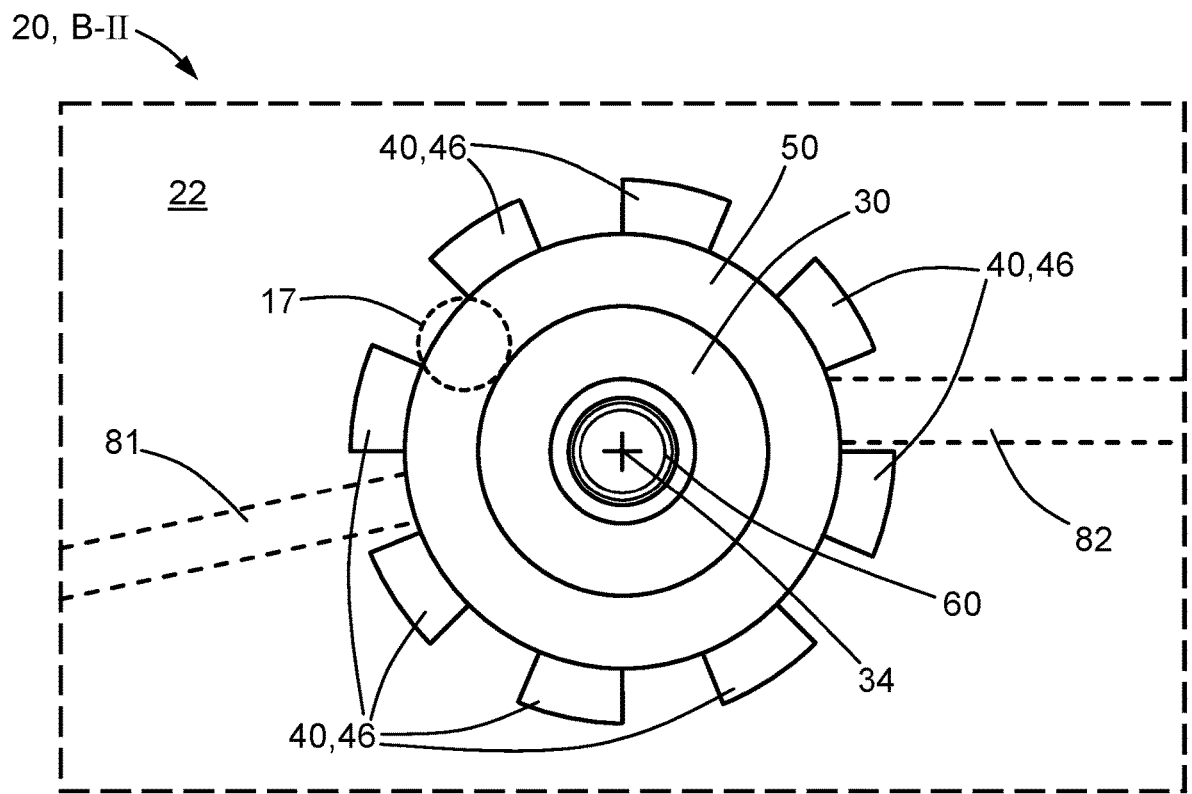
FIG. 13 is a schematic plan view of a further embodiment of the terminal arrangement, in which the outer wall includes a plurality of segments.

A generally tubular outer wall or ring 40 also extends upward from the upper surface 25 of the substrate 22. The outer wall 40 has a third or lower end 41 attached to or integrated with the substrate 22 and a fourth or upper end 42 opposite the third end 41. The outer wall 40 is made of a third electrically insulative material $M_3$ and has an outer radius $R_o$ extending from the central axis 34, wherein the outer radius $R_o$ is larger than the inner radius $R_i$ (i.e., $R_o > R_i$). For example, the inner radius $R_i$ may extend to the outer circumferential surface of the inner wall 30, and the outer radius $R_o$ may extend to the inner circumferential surface of the outer wall such that a radial span or spacing 54 is provided between the inner and outer walls 30, 40. The outer wall 40 has an outer wall height $H_o$ as measured from the upper surface 25, which may optionally be the same as the inner wall height $H_i$. As noted above, the outer wall 40 is oriented and disposed so as to be concentric with the inner wall 30. The outer wall 40 may assume the form of a single wall or ring, or it may assume the form of multiple segments 46 (as shown in FIG. 13 and discussed below) which together have a generally tubular shape or arrangement.

An electrically conductive annular terminal 50 is disposed atop the upper surface and encircles the inner wall 30 between the inner and outer walls 30, 40. Further, an electrically conductive tubular terminal 60 (e.g., a clinch nut) extends through an aperture or void 26 formed in the upper surface 25 of the substrate 22, with the tubular terminal 60 having an outer circumferential surface 62 disposed in physical contact with the inner circumferential surface 33 of the inner wall 30. Note that the annular terminal 50 may have the shape of a flat washer with a relatively small height or thickness as measured in the longitudinal direction $d_L$, while the inner and outer walls 30, 40 and the tubular terminal 60 each have respective heights as measured in the longitudinal direction $d_L$ that are much greater than the height or thickness of the annular terminal 50. The annular terminal 50 and the tubular terminal 60 are each made of an electrically conductive material, such as copper, steel or aluminum.

As noted above, FIGS. 3-6 illustrate successive steps for assembling one embodiment of the terminal arrangement 20. This sequence of assembly steps will now be explained step-by-step.

First, as shown in FIG. 3, a substrate 22 is provided, with the substrate 22 having an aperture 26 formed therein on the upper surface 25, and a pocket or void 29 formed on the underside of the substrate 22 opposite or underneath the aperture 26. The aperture 26 may be defined by a circumferential wall or edge 21 that extends down from the upper surface 25, with the circumferential wall/edge 21 being concentric with and defining the central axis 34. The substrate 22 includes an annular terminal 50 whose top surface 52 may be continuous or co-planar with the upper surface 25, or it may be disposed slightly above or below the upper surface 25. The substrate 22 may also contain or carry first and second electrical lines 81, 82 therein or thereon, which are electrically connected or connectable with each other as further described below. (Alternatively, only one of such lines 81, 82 may be provided, so the two lines 81, 82 that are shown may serve as two segments of a single electrical line.) Note that for illustration purposes FIG. 3 also includes an optional dielectric layer 70 having a window 72 therein, but this dielectric layer 70 is not included in FIGS. 4-6. Additionally, the substrate 22 may include a first plurality 27 of slots 28 formed therein (e.g., in and/or through the upper surface 25). Each slot 28 may include a cutout $28_c$ in the upper surface 25 (and/or in the dielectric layer 70), a main chamber $28_m$ underneath the cutout $28_c$, and a side chamber $28_s$ that is beside of and open to the main chamber $28_m$. The side chamber $28_s$ lies underneath a roof or overhang $28_o$ that is located radially outward from the cutout $28_c$. The portion of the substrate 22 which makes up the roof or overhang $28_o$ (as well as any other portions of the substrate 22 which help form the slot 28) may be made of a separate material from the rest of the substrate 22, if desired.

Figure 4:
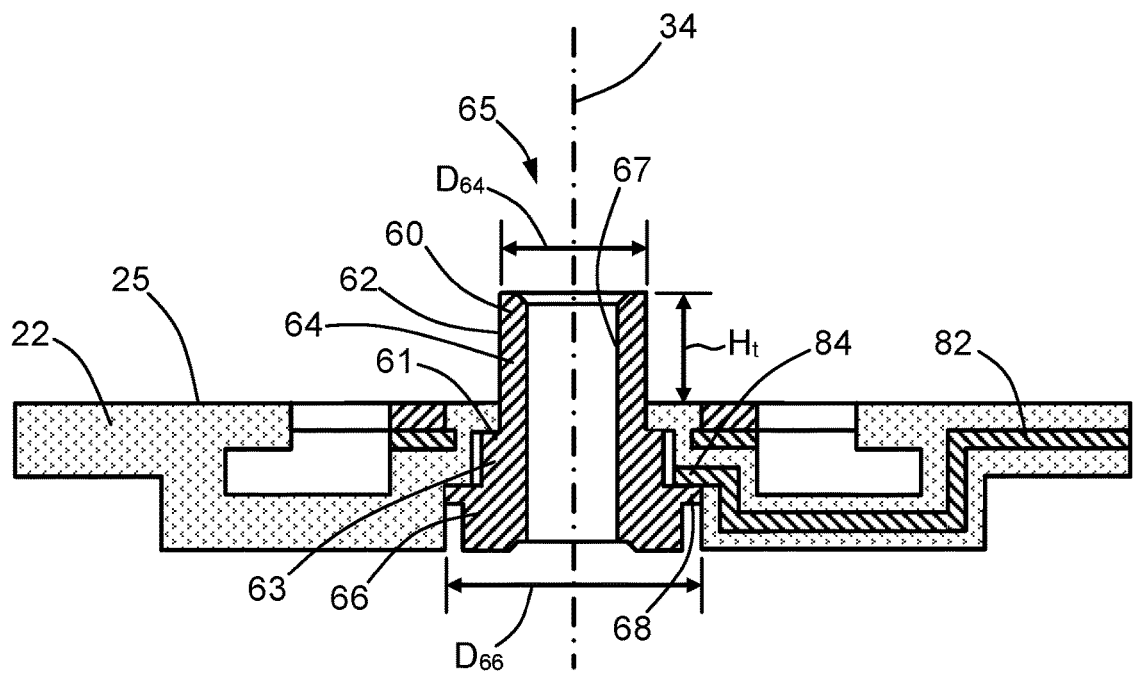
FIG. 4 is a schematic cross-sectional elevation view of the assembly of FIG. 3 with a tubular terminal (such as a clinch nut) added.

Second, as shown in FIG. 4, a tubular terminal 60 is inserted into the pocket 29 on the underside of the substrate 22, such that an upper portion 64 of the tubular terminal 60 extends a tubular terminal height $H_t$ above the upper surface 25 of the substrate 22 and a lower portion 66 remains below the upper surface 25 and within the pocket 29. The tubular terminal 60 may be dimensioned so as to have a first or main shoulder 68 which contacts an exposed portion 84 of the second electrical line 82, an upper portion 64 which fits up through the aperture 26 and has an upper portion diameter $D_{64}$, and a lower portion 66 which fits within the pocket 29 and has a lower portion diameter $D_{66}$ which does not allow the lower portion 66 to fit through the aperture 26. The tubular terminal 60 may also optionally have a second shoulder 61 on the outer circumferential surface 62 and a middle portion 63 between the upper and lower portions 64, 66. Optionally, the upper and lower portion diameters $D_{64}$, $D_{66}$ and the aperture 26 and pocket 29 may be dimensioned such that a snug fit is provided between the upper portion 64 and the aperture 26 and between the lower portion 66 and the inner sides of the pocket 29. A cylindrical hole 65 runs through the tubular terminal 60 in the longitudinal direction di, (concentric with the central axis 34) and is defined by an inner cylindrical surface 67 which may be threaded in order to mate with a threaded fastener.

Third, as shown in FIG. 5, an inner wall 30 is press-fitted over the upper portion 64 of the tubular terminal 60, such that an interference fit is provided between the inner circumferential surface 33 of the inner wall 30 and the outer circumferential surface 62 of the tubular terminal 60. This press fit or interference fit holds the inner wall 30 and the tubular terminal 60 in contact with each other, and may also serve to tightly clamp the inner wall 30 onto the upper surface 25 of the substrate 22 and the tubular terminal 60 against portions of the pocket 29 on the underside of the substrate 22. (Note that if the optional dielectric layer 70 is used, the inner wall 30 may be tightly clamped against the dielectric layer 70 or against the upper surface of the substrate 22, depending on whether or not the dielectric layer 70 extends underneath the inner wall 30.)

Figure 6:
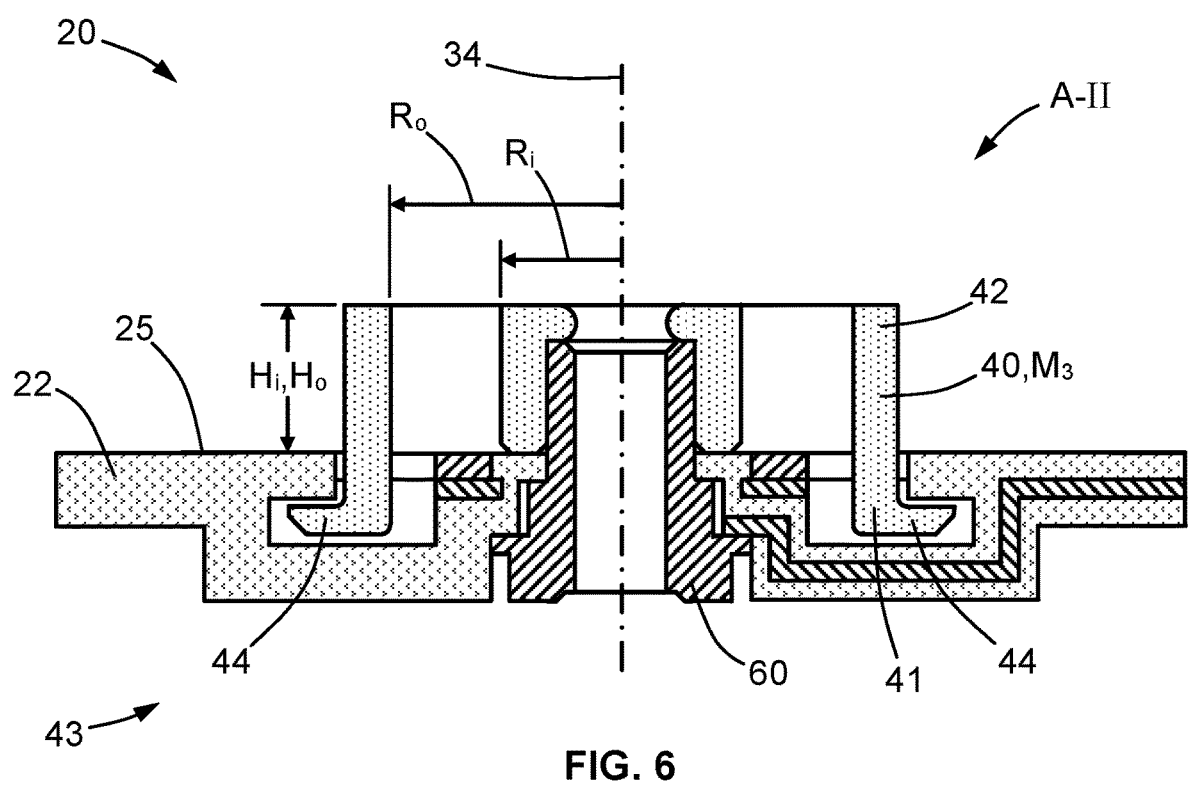
FIG. 6 is a schematic cross-sectional elevation view of the assembly of FIG. 5 with an outer wall added, thus completing the embodiment of the terminal arrangement.

Fourth, as shown in FIG. 6, an outer wall 40 is snap-fitted onto the substrate 22 by bending the second plurality 43 of tabs 44 inward (i.e., toward the central axis 34) and inserting/snapping them into the first plurality 27 of slots 28, such that the tabs 44 rest within the side chambers $28_s$ and are underneath and captured by the outer roofs/overhangs $28_o$ of the slots 28. As shown here in FIG. 6, when the substrate 22, the annular terminal 50, the tubular terminal the inner wall 30 and the outer wall 40 are provided and combined as described, the resulting combination provides an embodiment of the terminal arrangement 20.

Note, however, that these four steps may be executed in different orders than as described above. For example, the outer wall 40 may be snap-fitted onto the substrate 22 before the inner wall 30 and tubular terminal 60 are attached to the substrate 22. Also note that while the drawings show the tabs 38, 44 being somewhat spaced away from the sides of their respective slots 24, 28, this is merely for illustration purposes, as the tabs 38, 44 may touch or be flush against one or more sides or boundaries of their respective slots 24, 28.

Figure 14:
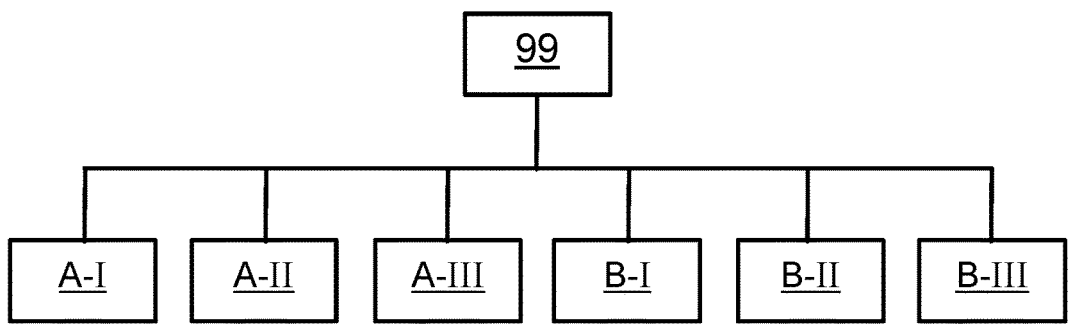
FIG. 14 is a block diagram illustrating various configurations for attaching the inner and outer walls to the substrate.

As variously shown in the drawings, and as particularly illustrated in the block diagram of FIG. 14, there are multiple attachment configurations 99 in which the inner and outer walls 30, 40 may be attached to or made integral with the substrate 22. Each of these attachment configurations 99 may be referred to by two reference characters: an initial alphabetical character—i.e., A or B—to designate how the outer wall 40 is attached to or made integral with the substrate 22, followed by a Roman numeral character—i.e., I, II or III—to designate how the inner wall 30 is attached to or made integral with the substrate 22.

Alphabetical character "A" indicates that the outer wall 40 is attached to the substrate 22 by the substrate 22 having a first plurality 27 of slots 28 formed in the upper surface of the substrate 22, and the outer wall 40 having a second plurality 43 of tabs 44 extending radially outward from the third or lower end 41, with the first plurality 27 of slots 28 and the second plurality 43 of tabs 44 being arranged and dimensioned such that the second plurality 43 of tabs 44 may be snap-fitted into respective ones of the first plurality 27 of slots 28. This "A" configuration is shown in FIGS. 1-8 and 12. Alternatively, alphabetical character "B" indicates that the outer wall 40 is molded as part of the substrate 22, as illustrated in FIGS. 9-11 and 13. Note that as used herein, "molded" means molded, fashioned or formed, such as by injection molding or some other molding or forming process, including additive manufacturing.

Figure 7:
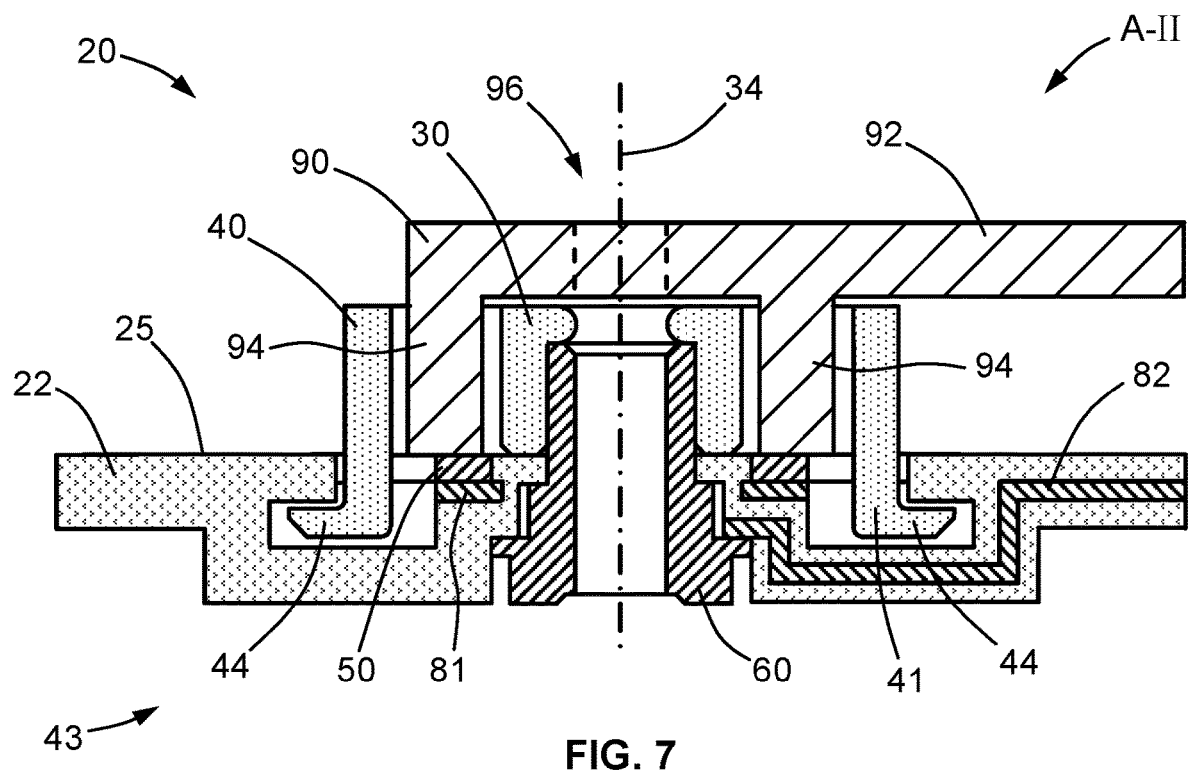
FIG. 7 is a schematic cross-sectional elevation view of the embodiment of FIG. 6 with a mating busbar added.
Figure 8:
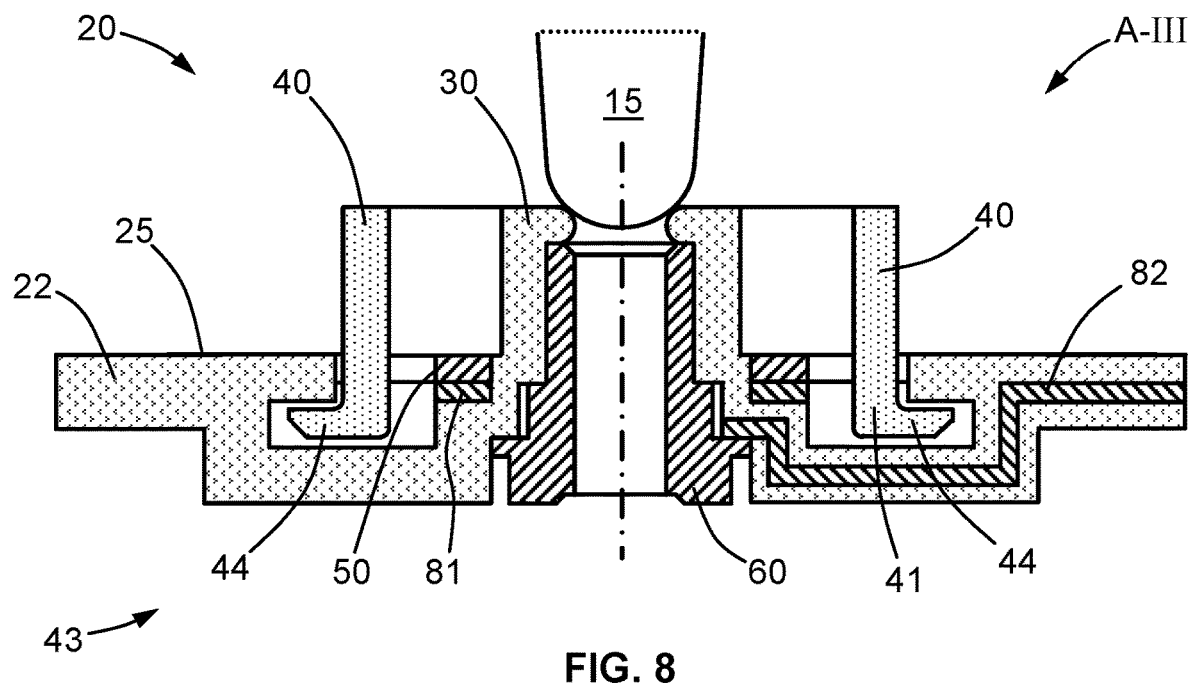
FIGS. 8-12 are schematic cross-sectional elevation views of other embodiments of the terminal arrangement.
Figure 9:
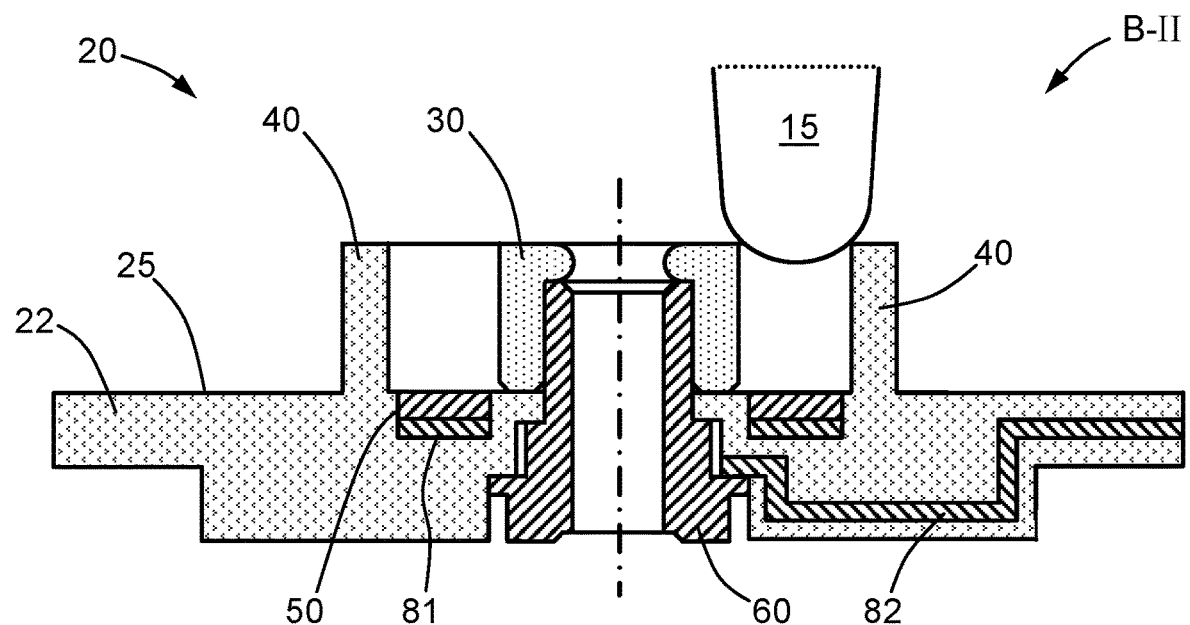
Figure 10:
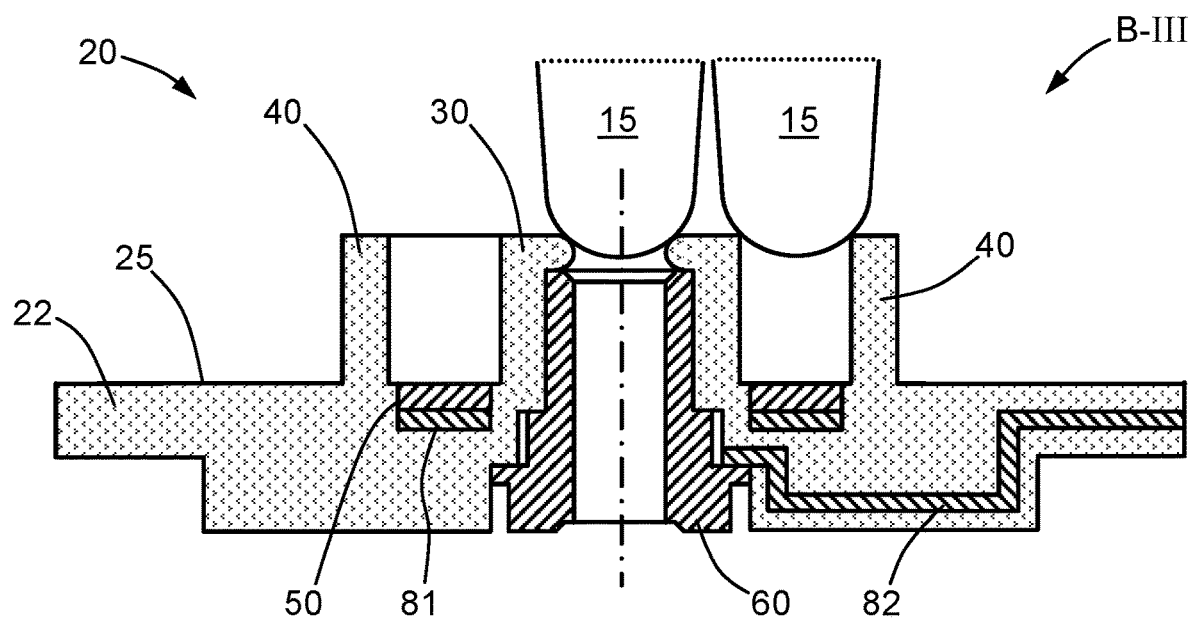
Figure 11:
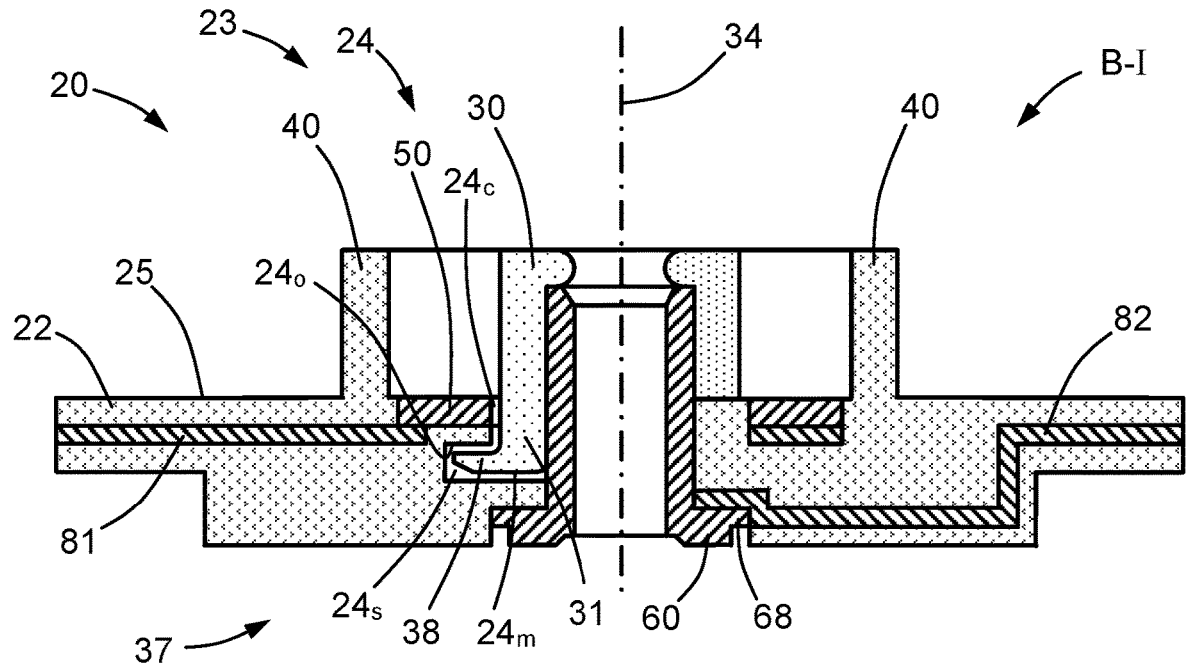
Figure 12:
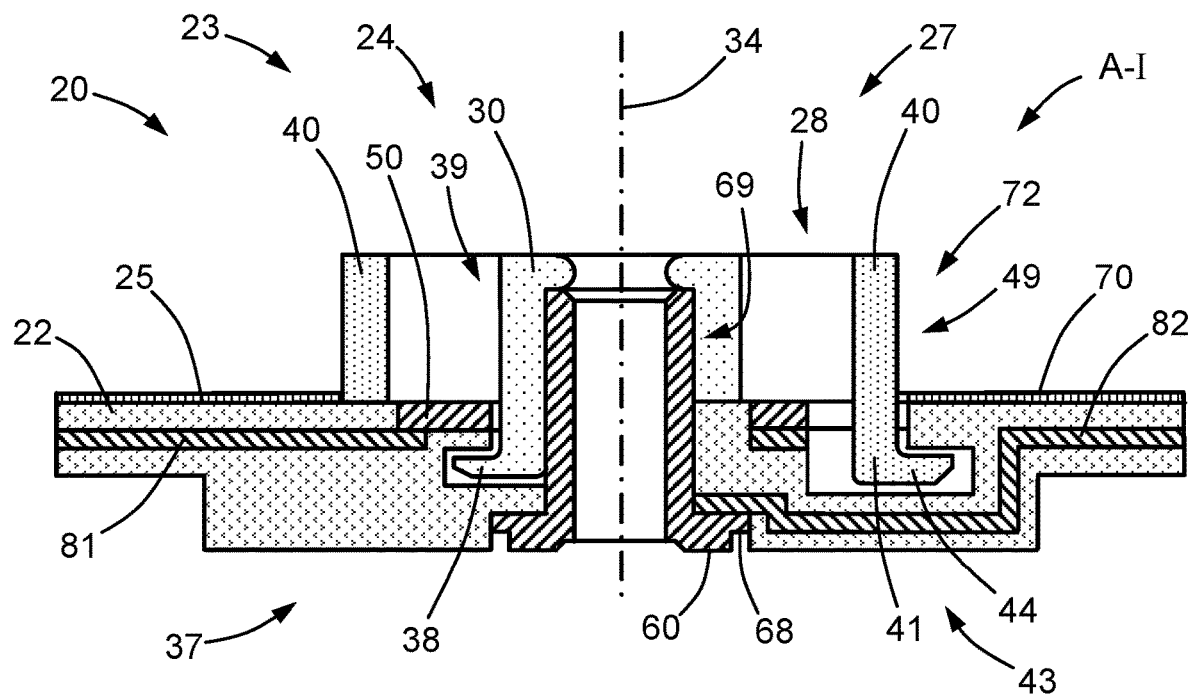

Roman numeral character "I" indicates that the inner wall 30 may be attached to the substrate 22 by the substrate 22 having a third plurality 23 of slots 24 formed in the upper surface 25 and the inner wall 40 having a fourth plurality 37 of tabs 38 extending radially outward from the first end 31, with the third plurality 23 of slots 24 and the fourth plurality 37 of tabs 38 being arranged and dimensioned such that the fourth plurality 37 of tabs 38 may be snap-fitted into respective ones of the third plurality 23 of slots 24, as illustrated in FIGS. 11-12. Alternatively, Roman numeral character "II" indicates that the inner wall 30 may be press-fitted onto an upper portion 64 of the tubular terminal 60, with the tubular terminal 60 having one or more shoulders 68 on the outer circumferential surface 62 which are wider than the aperture 26 in the upper surface of the substrate 22 so as to prevent a lower portion 66 of the tubular terminal 60 from passing through the aperture 26, as illustrated in FIGS. 6-7 and 9. (Note that this configuration may also be viewed as the upper portion 64 of the tubular terminal 60 being press-fitted into the inner wall or the upper portion 64 of the tubular terminal 60 and the inner wall 30 being press-fitted together with respect to each other. In whatever view is taken, some or all of the outer circumferential surface 62 of the tubular terminal 60 is disposed in physical contact with some or all of the inner circumferential surface 33 of the inner wall 30.) In this configuration, the upper portion 64 of the tubular terminal 60 has an upper portion diameter $D_{64}$ and the lower portion 66 has a lower portion diameter $D_{66}$ that is larger than the upper portion diameter $D_{64}$ (i.e., $D_{66} > D_{64}$). In addition to the upper portion 64 of the tubular terminal 60 being press-fitted into the inner wall the upper portion 64 may also be press-fitted within the aperture 26. (That is, the outer circumferential surface 62 of the tubular terminal 60 may be disposed in physical contact with the outer rim or circumferential wall/edge 21 of the aperture 26. More specifically, the part of the outer circumferential surface 62 that is in physical contact with the outer rim 21 of the aperture 26 may be the portion of the outer circumferential surface 62 that is around the upper portion 64 of the tubular terminal 60 And as a further alternative, Roman numeral character "III" indicates that the inner wall 30 may be molded as part of the substrate 22 (e.g., by injection molding or some other molding or forming process), as illustrated in FIGS. 8 and 10.

Thus, the embodiment shown in FIGS. 1-7 may be viewed as an "A-II" configuration, in which the outer wall 40 is attached to the substrate 22 by the substrate 22 having a first plurality 27 of slots 28 formed in the upper surface 25 and the outer wall 40 having a second plurality 43 of tabs 44 extending radially outward from the third end 41, with the second plurality 43 of tabs 44 being snap-fitted into respective ones of the first plurality 27 of slots 28 (hence the "A" part of the configuration). Additionally, the inner wall 30 is attached to the substrate 22 by the inner wall 30 being press-fitted onto an upper portion 64 of the tubular terminal 60 and the tubular terminal 60 having one or more shoulders 61, 68 on the outer circumferential surface 62 which are wider than the aperture 26 in the substrate 22 so as to prevent a lower portion 66 of the tubular terminal 60 from passing through the aperture 26 (hence the "II" part of the configuration).

In general, the outer wall 40 may be attached to the substrate 22 by the substrate 22 having a first plurality 27 of slots 28 formed in the upper surface 25 and the outer wall 40 having a second plurality 43 of tabs 44 extending radially outward from the third end 41, with the second plurality 43 of tabs 44 being snap-fitted into respective ones of the first plurality 27 of slots 28 (configuration "A"), or the outer wall 40 may be molded as part of the substrate 22 (configuration "B"). Additionally, the inner wall 30 may be attached to the substrate 22 by one or more of: (i) the substrate 22 having a third plurality 23 of slots 24 formed in the upper surface 25 and the inner wall 30 having a fourth plurality 37 of tabs 38 extending radially outward from the first end 31, with the fourth plurality 37 of tabs 38 being snap-fitted into respective ones of the third plurality 23 of slots 24 (configuration "I"); (ii) the inner wall 30 being press-fitted onto an upper portion 64 of the tubular terminal 60 with the tubular terminal 60 having one or more shoulders 68 on the outer circumferential surface 62 which are wider than the aperture 26 so as to prevent a lower portion 66 of the tubular terminal 60 from passing the aperture 26 (configuration "II"); and (iii) the inner wall 30 being molded as part of the substrate 22 (configuration "III"). Therefore, as shown in FIG. 14, there are six different basic attachment configurations 99: A-I, A-II, A-III, B-I, B-II and B-III. Additionally, two or more of the I, II and III configurations may be combined together.

The first plurality 27 of slots 28 and the second plurality 43 of tabs 44 (if configuration "A" is used), and/or the third plurality 23 of slots 24 and the fourth plurality 37 of tabs 38 (if configuration "I" is used), may be arranged circumferentially about the central axis 34, and may be arranged concentrically with respect to each other. If the "I" configuration is used (as illustrated in FIGS. 11-12), the substrate 22 may include the third plurality 23 of slots 24 formed therein (e.g., in and/or through the upper surface 25). In this case, each slot 24 may include a cutout $24_c$ in the upper surface 25 (and/or in the dielectric layer 70), a main chamber $24_m$ underneath the cutout $24_c$, and a side chamber $24_s$ that is beside of and open to the main chamber $24_m$. The side chamber $24_s$ lies underneath a roof or overhang 240 that is located radially outward from the cutout $24_c$. If the inner wall 30 is molded as part of the substrate 22, the inner wall 30 may cover or overmold at least a portion 69 (e.g., the upper portion 64) of the tubular terminal 60. For example, such covering or overmolding may be performed by insert molding, in which the tubular terminal 60 is placed into a mold as the "insert", and a polymer material is injected into the mold cavity around the tubular terminal 60. In this case, when the polymer cools or cures, the inner wall 30 is formed so as to hug, surround or encapsulate at least a portion 69 (e.g., the upper portion 64) of the tubular terminal 60. Also, if the outer wall 40 is molded as part of the substrate 22, the outer wall 40 may comprise a plurality of outer wall segments 46 arranged circumferentially about the central axis 34, as illustrated in FIG. 13.

The inner and outer walls 30, 40 may have respective inner and outer heights $H_i$, $H_o$ above a top surface 52 of the annular terminal 50 (and/or above the upper surface 25 of the substrate 22), and the annular terminal 50 may have a radial span 54 between the inner and outer walls 30, 40, wherein the inner and outer heights $H_i$, $H_o$ and the radial span 54 are sized, spaced or otherwise configured so as to preclude one or more human fingertips or a fingertip probe 15 above a predetermined size from being able to touch the annular terminal 50, thus rendering the terminal arrangement 20 "fingerproof". In other words, the heights $H_i$, $H_o$ of the inner and outer walls 30, and the radial span or spacing 54 therebetween may be selected so as to prevent a worker's fingers 15 from accidentally touching and potentially receiving a shock from the annular terminal 50. This "fingerproofing" may be verified during production and assembly of the terminal arrangement 20 by using standardized fingertip probes 15 (i.e., finger-shaped testing devices) to make sure that the probes 15 are not able to touch the annular terminal 50. Note that the predetermined size of the fingertip probe 15 may be selected so as to mimic a particular male or female finger at a given percentile in size (e.g., a $5^{th}$ percentile female index finger, a $95^{th}$ percentile male index finger, etc.).

In addition to (or as an alternative to) fingerproofing the annular terminal 50, the tubular terminal 60 may be fingerproofed as well. For example, the annular lip 35 may have an annular lip thickness $T_{35}$ (as measured in the longitudinal direction $d_L$) and may define an annular hole 36 having an annular hole diameter $D_{36}$ (as measured radially), wherein the annular hole diameter $D_{36}$ and the annular lip thickness $T_{35}$ are sized and/or arranged so as to preclude human fingertips (or a fingertip probe) 15 above a predetermined size from being able to touch or contact the tubular terminal 60. (I.e., the annular hole 36 is too small, and/or the annular lip thickness $T_{35}$ is too thick or tall, to allow a human finger or a fingertip probe 15 above a predetermined size to touch the tubular terminal 60.)

The second and third electrically insulative materials $M_2$, $M_3$ may be the same material, or the first, second and third electrically insulative materials $M_1$, $M_2$, $M_3$ may be the same material. Exemplary candidates for these materials $M_1$, $M_2$, $M_3$ include (but are not limited to) thermoplastic polymers and thermoset polymers. As one example, the second electrically insulative material $M_2$ used to make the inner wall 30 may be an elastomeric material in order to facilitate the inner wall 30 being press-fitted onto the tubular terminal 60, and the third electrically insulative material $M_3$ used to make the outer wall 40 may be a relatively stiff polymer. The terminal arrangement 20 may further include a dielectric layer 70 covering some or all of the substrate 22 and having a window 72 formed therein through which respective portions 39, 49, 69 of the inner wall 30, the outer wall 40 and the tubular terminal 60 may protrude. The terminal arrangement 20 may also include a first electrical line 81 carried by the substrate 22 and operatively connected to the annular terminal 50, and a second electrical line 82 carried by the substrate 22 and operatively connected to the tubular terminal 60. Each of these electrical lines 81, 82 may include a wire, a cable, a layer, a trace, a mechanical component or the like which is made of an electrically conductive material (e.g., copper, aluminum, other metals, carbon, carbon nanotubes, graphene, etc.) and is capable of safely carrying the voltage and amperage required for the intended application (such as for a high-voltage battery or battery module in an electric vehicle—e.g., up to 800 volts and up to 125 amps). As used herein, an electrical line 81, 82 being "carried by the substrate 22" means that the electrical line 81, 82 may be disposed on or attached to an outer or exposed surface of the substrate 22, and/or that the electrical line 81, 82 may be buried within the substrate 22. Also note that while some of the drawings may show the two electrical lines 81, 82 as appearing to be separate from each other, it should be noted that these two lines 81, 82 are electrically connected to each other, particularly when all the components of the terminal arrangement 20 are in place.

FIG. 6 shows a schematic cross-sectional view of the substrate 22 and tubular terminal 60 after the inner and outer walls 30, 40 have been attached to the substrate 22, thereby forming a terminal arrangement 20. FIG. 7 shows the same view as FIG. 6, but with a mating busbar 90 placed in mechanical and electrical contact with the terminal arrangement 20. More specifically, the mating busbar 90 includes a generally tubular wall or ring portion 94 extending from one end of a main portion 92 of the busbar 90, with the ring portion 94 being sized and dimensioned such that it may be inserted between the inner and outer walls 30, 40 and placed in tactile and electrical contact with the annular terminal 50. A fastener hole 96 may be provided in the main portion 94 so that a fastener (e.g., a bolt) may be inserted through the fastener hole 96 and into the (optionally threaded) cylindrical hole 65 of the tubular terminal 60. Although not shown in the drawings, the mating busbar 90 includes an electrical lead which runs through the main portion 92 and the ring portion 94. A fastener (not shown) is inserted through the fastener hole 96 and secured (e.g., by threads) so as to bring the ring portion 94 into mechanical and electrical contact with the annular terminal 50.

Note that in FIGS. 6-7, the terminal arrangement 20 may be viewed as being in an "A-II" configuration. With regard to FIGS. 3-4, a terminal arrangement 20 has not yet been formed since the inner and outer walls 30, 40 have not been attached, but once the inner wall 30 has been attached (as shown in FIG. 5) then a "II" configuration will have been completed, and once the outer wall 40 has been attached (as shown in FIG. 6) then a configuration "A" will also have been completed, thus providing a terminal arrangement 20 in an "A-II" configuration.

FIG. 8 shows a schematic cross-sectional view of another embodiment of the terminal arrangement 20, with this one being in an "A-III" configuration wherein the inner wall is integrally formed with the substrate 22. In comparison, FIG. 9 shows a schematic cross-sectional view of yet another embodiment of the terminal arrangement 20, with this one being in a "B-II" configuration. Here, the outer wall 40 is integrally formed with the substrate 22, and the inner wall 30 is press-fitted onto upper portion 64 of the tubular terminal 60. And FIG. 10 shows a schematic cross-sectional view of a further embodiment in a "B-III" configuration, in which both the inner and outer walls 30, 40 are integrally formed with the substrate 22. Note that FIGS. 8-10 show a distal portion of a human finger or a finger probe 15 of a predetermined size which is prevented from being able to touch the annular terminal 50 or the tubular terminal 60. Additionally, FIG. 11 shows an embodiment in a "B-I" configuration in which the outer wall 40 is integrally formed with the substrate 22 and the inner wall 30 has a third plurality 23 of slots 24 snap-fitted into a fourth plurality 37 of slots 38, while FIG. 12 shows an embodiment in an "A-I" configuration in which both the inner and outer walls 30, 40 have respective tabs 38, 44 which are snap-fitted into respective slots 28, 24. (In the B-I and A-I embodiments of FIGS. 11-12, it may be advantageous to attach the inner wall 30 to the substrate 22 before inserting the tubular terminal and attaching the outer wall 40.) And FIG. 13 shows a schematic plan view of a "B-II" configuration in which the outer wall 40 is made up of a number of individual segments 46 that are all integrally formed with the substrate 22 and the inner wall 30 is press-fitted onto the tubular terminal 60. Note that the dashed circle 17 represents the largest circle that may fit between two adjacent segments 46 and the inner wall 30, which represents the maximum extent to which a human finger or a finger probe 15 of a predetermined size may penetrate between the two segments 46 and the inner wall 30 toward the annular terminal 50. Also, though not shown in the drawing, the segments 46 are also sized, spaced and arranged so as to prevent a human finger or a finger probe 15 of a predetermined size from touching the annular terminal 50 by reaching in radially (in between adjacent segments 46).

It may be noted that in FIGS. 1-2 and 8, from the top plan view shown in each drawing it is not apparent which particular attachment configuration 99 is being used to attach or integrate the inner and outer walls 30, 40 with the substrate 22. However, FIG. 2 does show two slots 28 in the upper surface 25 of the substrate 22 which are used for two tabs 44 (not shown) which mate with the slots 28 for attaching the outer wall 40 to the substrate 22, so it is apparent that at least an "A" configuration is being used for this terminal arrangement 20.

According to another embodiment, a terminal arrangement 20 for a high-voltage battery includes: (i) a substrate 22 made of a first electrically insulative material $M_1$ and having an upper surface 25; (ii) a generally tubular inner wall 30 extending at a first end 31 thereof from the upper surface 25 and terminating at a second end 32 thereof opposite the first end 31, wherein the inner wall 30 is made of a second electrically insulative material $M_2$ and has an inner circumferential surface 33 disposed at an inner radius $R_i$ from a central axis 34 of the inner wall and an annular lip 35 extending inward from the second end 32; (iii) a generally tubular outer wall 40 extending at a third end 41 thereof from the upper surface 25 and terminating at a fourth end 42 thereof opposite the third end 41, wherein the outer wall 40 is made of a third electrically insulative material $M_3$ and has an outer radius $R_o$ larger than the inner radius $R_i$, and extending from the central axis 34, wherein the outer wall 40 is concentric with the inner wall 30; (iv) an electrically conductive annular terminal 50 disposed atop the upper surface 25 and encircling the inner wall 30 between the inner and outer walls 30, 40; (v) an electrically conductive tubular terminal 60 extending through an aperture 26 formed in the upper surface 25 of the substrate 22 and having an outer circumferential surface 62 disposed in contact with the inner circumferential surface 33 of the inner wall 30; (vi) a dielectric layer 70 covering the substrate 22 and having a window 72 formed therein through which respective portions 39, 49, 69 of the inner wall 30, the outer wall 40 and the tubular terminal 60 protrude; and (vii) one or more electrical lines, such as the first and second electrical lines 81, 82, which are carried by the substrate 22 and operatively connected to the annular terminal 50 and the tubular terminal 60.

In this embodiment, the outer wall 40 is attached to the substrate 22 by (a) the substrate 22 having a first plurality 27 of slots 28 formed in the upper surface 25 and the outer wall 40 having a second plurality 43 of tabs 44 extending radially outward from the third end 41, with the second plurality 43 of tabs 44 being snap-fitted into respective ones of the first plurality 27 of slots 28, or (b) the outer wall 40 being molded as part of the substrate 22. Also in this embodiment, the inner wall 30 is attached to the substrate 22 by (c) the substrate 22 having a third plurality 23 of slots 24 formed in the upper surface 25 and the inner wall 30 having a fourth plurality 37 of tabs 38 extending radially outward from the first end 31, with the fourth plurality 37 of tabs 38 being snap-fitted into respective ones of the third plurality 23 of slots 24, or (d) the inner wall 30 being press-fitted onto an upper portion 64 of the tubular terminal 60 and the tubular terminal 60 having one or more shoulders 68 on the outer circumferential surface 62 which are wider than the aperture 26 so as to prevent a lower portion 66 of the tubular terminal 60 from passing through the aperture 26, or (e) the inner wall 30 being molded as part of the substrate 22.

Also in this embodiment, the first plurality 27 of slots 28, the second plurality 43 of tabs 44, the third plurality 23 of slots 24 and the fourth plurality 37 of tabs 38 may each be arranged circumferentially about the central axis 34. Also, the inner wall 30 may be molded as part of the substrate 22 and may cover or overmold at least a portion 69 of the tubular terminal 60, and the outer wall 40 may be molded as part of the substrate 22 and the outer wall 40 may comprise a plurality of outer wall segments 46 arranged circumferentially about the central axis 34.

The inner and outer walls 30, 40 may have respective inner and outer heights $H_i$, $H_o$ above a top surface 52 of the annular terminal 50, and the annular terminal 50 may have a radial span 54 between the inner and outer walls 30, 40, wherein the inner and outer heights $H_i$, $H_o$ and the radial span 54 are sized so as to preclude human fingertips 15 above a predetermined size from touching the annular terminal 50. Additionally, the annular lip 35 may have an annular lip thickness $T_{35}$ and may define an annular hole 36 having an annular hole diameter $D_{36}$, wherein the annular hole diameter $D_{36}$ and the annular lip thickness $T_{35}$ are sized so as to preclude human fingertips 15 above a predetermined size from touching the tubular terminal 60. Further, the second and third electrically insulative materials $M_2$, $M_3$ may be the same.

According to yet another embodiment, a terminal arrangement 20 for a high-voltage battery includes: a substrate 22 made of a first electrically insulative material $M_1$ and having an upper surface 25; a tubular inner wall 30 extending at a first end 31 thereof from the upper surface and terminating at a second end 32 thereof opposite the first end 31, wherein the inner wall 30 is made of a second electrically insulative material $M_2$ and has an inner circumferential surface 33 disposed at an inner radius $R_i$ from a central axis 34 of the inner wall 30 and an annular lip 35 extending inward from the second end 32; a tubular outer wall 40 extending at a third end 41 thereof from the upper surface 25 and terminating at a fourth end 42 thereof opposite the third end 41, wherein the outer wall 40 is made of a third electrically insulative material $M_3$ and has an outer radius $R_o$ larger than the inner radius $R_i$ extending from the central axis 34, wherein the outer wall is concentric with the inner wall 30; an electrically conductive annular terminal 50 disposed atop the upper surface 25 and encircling the inner wall 30 between the inner and outer walls 30, and an electrically conductive tubular terminal 60 extending through an aperture 26 formed in the upper surface 25 of the substrate 22 and having an outer circumferential surface 62 disposed in contact with the inner circumferential surface 33 of the inner wall 30.

The outer wall 40 is attached to the substrate 22 by the substrate 22 having a first plurality 27 of slots 28 formed in the upper surface 25 and the outer wall 40 having a second plurality 43 of tabs 44 extending radially outward from the third end 41, with the second plurality 43 of tabs 44 being snap-fitted into respective ones of the first plurality 27 of slots 28. The inner wall 30 is attached to the substrate 22 by the inner wall 30 being press-fitted onto an upper portion 64 of the tubular terminal 60 and the tubular terminal 60 having one or more shoulders 68 on the outer circumferential surface 62 which are wider than the aperture 26 so as to prevent a lower portion 66 of the tubular terminal 60 from passing through the aperture 26.

In this configuration, the inner and outer walls 30, 40 may have respective inner and outer heights $H_i$, $H_o$ above a top surface 52 of the annular terminal 50 and the annular terminal 50 may have a radial span 54 between the inner and outer walls 30, 40, wherein the inner and outer heights $H_i$, $H_o$ and the radial span 54 are sized so as to preclude human fingertips 15 above a predetermined size from touching the annular terminal 50. The terminal arrangement 20 may further include a dielectric layer 70 covering the substrate 22 and having a window 72 formed therein through which respective portions 39, 49, 69 of the inner wall 30, the outer wall 40 and the tubular terminal 60 protrude. This configuration may further include one or more electrical lines, such as the first and second electrical lines 81, 82, which are carried by the substrate 22 and operatively connected to the annular terminal 50 and the tubular terminal 60.

In each of the above configurations and embodiments, electrical power (e.g., high-voltage power) may be passed along an electrical line carried by the substrate 22 (such as line 81 and/or line 82), then through the annular terminal 50 and/or the tubular terminal 60, and then into the busbar 90 via the tubular wall/ring portion 94 (and optionally also via the fastener which extends through the fastener hole 96 and is connected with the tubular terminal 60). Or, the electrical power may travel in the opposite direction.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", "upper", "lower", "inner", "outer", etc. are used merely as labels, and are not intended to impose numerical or positional requirements on their objects unless required by context or logic. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising", "including" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A terminal arrangement, comprising:
   a substrate made of a first electrically insulative material and having an upper surface;

a generally tubular inner wall extending at a first end thereof from the upper surface and terminating at a second end thereof opposite the first end, wherein the inner wall is made of a second electrically insulative material and has an inner circumferential surface disposed at an inner radius from a central axis of the inner wall and an annular lip extending inward from the second end;
a generally tubular outer wall extending at a third end thereof from the upper surface and terminating at a fourth end thereof opposite the third end, wherein the outer wall is made of a third electrically insulative material and has an outer radius larger than the inner radius extending from the central axis, wherein the outer wall is concentric with the inner wall;
an electrically conductive annular terminal disposed atop the upper surface and encircling the inner wall between the inner and outer walls; and
an electrically conductive tubular terminal extending through an aperture formed in the upper surface of the substrate and having an outer circumferential surface disposed in contact with the inner circumferential surface of the inner wall;
wherein the outer wall is attached to the substrate by:
the substrate having a first plurality of slots formed in the upper surface and the outer wall having a second plurality of tabs extending radially outward from the third end, with the second plurality of tabs being snap-fitted into respective ones of the first plurality of slots, or
the outer wall being molded as part of the substrate; and
wherein the inner wall is attached to the substrate by at least one of:
the substrate having a third plurality of slots formed in the upper surface and the inner wall having a fourth plurality of tabs extending radially outward from the first end, with the fourth plurality of tabs being snap-fitted into respective ones of the third plurality of slots,
the inner wall being press-fitted onto an upper portion of the tubular terminal and the tubular terminal having one or more shoulders on the outer circumferential surface which are wider than the aperture so as to prevent a lower portion of the tubular terminal from passing through the aperture, and
the inner wall being molded as part of the substrate.

2. The terminal arrangement of claim 1, wherein the first plurality of slots, the second plurality of tabs, the third plurality of slots and the fourth plurality of tabs are each arranged circumferentially about the central axis.

3. The terminal arrangement of claim 1, wherein the inner wall is molded as part of the substrate and covers at least a portion of the tubular terminal.

4. The terminal arrangement of claim 1, wherein the outer wall is molded as part of the substrate and the outer wall comprises a plurality of outer wall segments arranged circumferentially about the central axis.

5. The terminal arrangement of claim 1, wherein the inner and outer walls have respective inner and outer heights above a top surface of the annular terminal and the annular terminal has a radial span between the inner and outer walls, wherein the inner and outer heights and the radial span are sized so as to preclude human fingertips above a predetermined size from touching the annular terminal.

6. The terminal arrangement of claim 1, wherein the annular lip has an annular lip thickness and defines an annular hole having an annular hole diameter, wherein the annular hole diameter and the annular lip thickness are sized so as to preclude human fingertips above a predetermined size from touching the tubular terminal.

7. The terminal arrangement of claim 1, wherein the second and third electrically insulative materials are the same.

8. The terminal arrangement of claim 1, wherein the first, second and third electrically insulative materials are the same.

9. The terminal arrangement of claim 1, further comprising:
a dielectric layer covering the substrate and having a window formed therein through which respective portions of the inner wall, the outer wall and the tubular terminal protrude.

10. The terminal arrangement of claim 1, further comprising:
an electrical line carried by the substrate and operatively connected to at least one of the annular terminal and the tubular terminal.

11. A terminal arrangement for a high-voltage battery, comprising:
a substrate made of a first electrically insulative material and having an upper surface;
a generally tubular inner wall extending at a first end thereof from the upper surface and terminating at a second end thereof opposite the first end, wherein the inner wall is made of a second electrically insulative material and has an inner circumferential surface disposed at an inner radius from a central axis of the inner wall and an annular lip extending inward from the second end;
a generally tubular outer wall extending at a third end thereof from the upper surface and terminating at a fourth end thereof opposite the third end, wherein the outer wall is made of a third electrically insulative material and has an outer radius larger than the inner radius extending from the central axis, wherein the outer wall is concentric with the inner wall;
an electrically conductive annular terminal disposed atop the upper surface and encircling the inner wall between the inner and outer walls;
an electrically conductive tubular terminal extending through an aperture formed in the upper surface of the substrate and having an outer circumferential surface disposed in contact with the inner circumferential surface of the inner wall;
a dielectric layer covering the substrate and having a window formed therein through which respective portions of the inner wall, the outer wall and the tubular terminal protrude; and
an electrical line carried by the substrate and operatively connected to at least one of the annular terminal and the tubular terminal;
wherein the outer wall is attached to the substrate by:
the substrate having a first plurality of slots formed in the upper surface and the outer wall having a second plurality of tabs extending radially outward from the third end, with the second plurality of tabs being snap-fitted into respective ones of the first plurality of slots, or
the outer wall being molded as part of the substrate; and
wherein the inner wall is attached to the substrate by at least one of:
the substrate having a third plurality of slots formed in the upper surface and the inner wall having a fourth plurality of tabs extending radially outward from the first end, with the fourth plurality of tabs being snap-fitted into respective ones of the third plurality of slots, the inner wall being press-fitted onto an upper portion of the tubular terminal and the tubular terminal having one or more shoulders on the outer circumferential surface which are wider than the aperture so as to prevent a lower portion of the tubular terminal from passing through the aperture, and the inner wall being molded as part of the substrate;

wherein the first plurality of slots, the second plurality of tabs, the third plurality of slots and the fourth plurality of tabs are each arranged circumferentially about the central axis.

12. The terminal arrangement of claim 11, wherein the inner wall is molded as part of the substrate and covers at least a portion of the tubular terminal.

13. The terminal arrangement of claim 11, wherein the outer wall is molded as part of the substrate and the outer wall comprises a plurality of outer wall segments arranged circumferentially about the central axis.

14. The terminal arrangement of claim 11, wherein the inner and outer walls have respective inner and outer heights above a top surface of the annular terminal and the annular terminal has a radial span between the inner and outer walls, wherein the inner and outer heights and the radial span are sized so as to preclude human fingertips above a predetermined size from touching the annular terminal.

15. The terminal arrangement of claim 11, wherein the annular lip has an annular lip thickness and defines an annular hole having an annular hole diameter, wherein the annular hole diameter and the annular lip thickness are sized so as to preclude human fingertips above a predetermined size from touching the tubular terminal.

16. The terminal arrangement of claim 11, wherein the second and third electrically insulative materials are the same.

17. A terminal arrangement for a high-voltage battery, comprising:

a substrate made of a first electrically insulative material and having an upper surface;

a tubular inner wall extending at a first end thereof from the upper surface and terminating at a second end thereof opposite the first end, wherein the inner wall is made of a second electrically insulative material and has an inner circumferential surface disposed at an inner radius from a central axis of the inner wall and an annular lip extending inward from the second end;

a tubular outer wall extending at a third end thereof from the upper surface and terminating at a fourth end thereof opposite the third end, wherein the outer wall is made of a third electrically insulative material and has an outer radius larger than the inner radius extending from the central axis, wherein the outer wall is concentric with the inner wall;

an electrically conductive annular terminal disposed atop the upper surface and encircling the inner wall between the inner and outer walls; and an electrically conductive tubular terminal extending through an aperture formed in the upper surface of the substrate and having an outer circumferential surface disposed in contact with the inner circumferential surface of the inner wall;

wherein the outer wall is attached to the substrate by the substrate having a first plurality of slots formed in the upper surface and the outer wall having a second plurality of tabs extending radially outward from the third end, with the second plurality of tabs being snap-fitted into respective ones of the first plurality of slots; and wherein the inner wall is attached to the substrate by the inner wall being press-fitted onto an upper portion of the tubular terminal and the tubular terminal having one or more shoulders on the outer circumferential surface which are wider than the aperture so as to prevent a lower portion of the tubular terminal from passing through the aperture.

18. The terminal arrangement of claim 17, wherein the inner and outer walls have respective inner and outer heights above a top surface of the annular terminal and the annular terminal has a radial span between the inner and outer walls, wherein the inner and outer heights and the radial span are sized so as to preclude human fingertips above a predetermined size from touching the annular terminal.

19. The terminal arrangement of claim 17, further comprising:

a dielectric layer covering the substrate and having a window formed therein through which respective portions of the inner wall, the outer wall and the tubular terminal protrude.

20. The terminal arrangement of claim 19, further comprising:

an electrical line carried by the substrate and operatively connected to at least one of the annular terminal and the tubular terminal.

* * * * *